United States Patent [19]

Hefner, Jr.

[11] 4,409,371

[45] Oct. 11, 1983

[54] DICYCLOPENTADIENE MODIFIED POLYESTERAMIDES CONTAINING ENDOMETHYLENETETRAHYDROPHTHA-LYL FUNCTIONALITY AND PROCESS FOR PREPARING SAME

[75] Inventor: Robert E. Hefner, Jr., Lake Jackson, Tex.

[73] Assignee: The Dow Chemical Company, Midland, Mich.

[21] Appl. No.: 366,507

[22] Filed: Apr. 8, 1982

[51] Int. Cl.$^3$ .................... C08F 283/00; C08G 63/76; C08L 67/00
[52] U.S. Cl. ................................. 525/418; 528/288; 528/298; 528/303; 549/237; 560/117
[58] Field of Search ...................... 528/288, 298, 303; 560/117; 549/237; 525/418

[56] References Cited

U.S. PATENT DOCUMENTS

| | | | |
|---|---|---|---|
| 3,340,327 | 9/1967 | Spellberg et al. | 528/288 |
| 3,933,757 | 1/1976 | Pratt et al. | 528/303 |
| 3,956,228 | 5/1976 | Nogami et al. | 528/298 |
| 4,246,367 | 1/1981 | Curtis | 528/298 |
| 4,248,997 | 2/1981 | Ihida | 528/298 |
| 4,299,950 | 11/1981 | Iwata et al. | 528/288 |
| 4,348,499 | 9/1982 | Nelson | 528/303 |

*Primary Examiner*—Lucille M. Phynes

[57] ABSTRACT

Dicyclopentadiene modified polyesteramides containing endomethylenetetrahydrophthalyl functionality within the esteramide chain show improved reactivity during cure. The process for preparing the modified polyesteramides provides for improved hydrocarbon modifier efficiency.

18 Claims, No Drawings

DICYCLOPENTADIENE MODIFIED POLYESTERAMIDES CONTAINING ENDOMETHYLENETETRAHYDROPHTHALYL FUNCTIONALITY AND PROCESS FOR PREPARING SAME

BACKGROUND OF THE INVENTION

Unsaturated polyesters and polyamides are two classes of materials useful in the fabrication of a wide variety of products. By varying the starting monomers, some can be made spinnable into fibers and filaments; some are useful in casting; some are moldable; still others can be formulated into coatings. The physical and chemical properties can be changed through choice of monomers, polymerization procedures and other means. None are without one or more deficiencies, however.

More recently, a class of polyesteramides has been developed. Basically, those materials have been the random interpolymerization of a decarboxylic acid with a diol and a diamine. The products have exhibited a spectrum of properties substantially different from either polyesters or polyamides.

Also recently, polyesters have been modified with dicyclopentadiene to result in products having reduced shrinkage upon curing, enhanced hydrophobicity and better economics that the corresponding unmodified polyesters.

Although all of those materials have been useful in making products acceptable in the marketplace, there is room for considerable improvement in many of their properties.

SUMMARY OF THE INVENTION

This invention provides a new class of modified polyesteramides having an improved spectrum of properties. The polyesteramides have at least one terminal group that is a dicyclopentadienyl radical and intramolecular endomethylenetetrahydrophthalyl functionality.

DETAILED DESCRIPTION OF THE INVENTION

The new polyesteramides have a central esteramide chain and have at least one terminal dicyclopentadienyl radical. The central esteramide chain is composed of the polymerizate of a diamine, a polyol and an unsaturated polycarboxylic acid, at least a part of which is endomethylenetetrahydrophthalic acid.

The diamine is from the class of those having the formula:

$$HN-R_3-NH$$
$$\hspace{0.3cm}|\hspace{0.9cm}|$$
$$\hspace{0.2cm}R_1\hspace{0.6cm}R_2$$

wherein $R_1$ and $R_2$ are independently selected from the group consisting of hydrogen, aliphatic, cycloaliphatic and aromatic radicals or $R_1$ and $R_2$ taken together with the remainder of the molecule form an aliphatic ring; and $R_3$ is a divalent organic radical selected from the group consisting of alkylene, ether-linked alkylene, ether-linked arylene, alkylene amino-linked alkylene, alkylene amino-linked cycloalkylene, cycloalkylene, polycycloalkylene, arylene, alkylarylene, bis(alkyl)cycloalkylene and bis(alkyl)polycycloalkylene.

Typical diamines that are useful herein are ethylene diamine, propylene diamine, hexane-1,6-diamine, piperazine, 4,4'-methylenebis(cyclohexylamine), 2,2'-bis(4-aminocyclohexyl)propane, 4,4'-diaminodiphenyl ether, bis(aminomethyl)norbornane, toluene diamine, bis-(aminomethyl)dicyclopentadiene and homopiperazine. Typical polyamines are aminoethylpiperazine and diethylenetriamine.

The polyol is from the class of those having the formula:

$$HO-R_3-OH$$

wherein $R_3$ is a divalent organic radical selected from the group consisting of alkylene, ether-linked alkylene, ether-linked arylene, cycloalkylene, polycycloalkylene, bis(alkyl)cycloalkylene, bis(alkyl)polycycloalkylene, and arylene. Mixtures of two or more of such polyols can be used.

Representative of the useful polyols are the diols such as ethylene glycol, propylene glycol, diethylene glycol, dipropylene glycol, dicyclopentadiene dimethanol, bis(-hydroxymethyl)norbornane, methyl cyclohexanedimethanol, bis(hydroxypropyl)bisphenol A and other hydroxyalkylated bisphenols, pentaerythritol, sorbitol and glycerine.

The ratio of diamine to polyol can be varied within wide limits. That ratio is significantly related to the solubility of the modified polyesteramide in reactive diluents, such as styrene, which are commonly employed with polyesteramides for many applications. As a general rule, the moles of diamine should not exceed about ⅓ the combined moles of the polyol and diamine. The structure and size of the diamine molecule will determine to great extent the maximum amount of diamine that can be used.

The unsaturated polycarboxylic acid is composed, at least in part, of endomethylenetetrahydrophthalic acid with the remainder being an α,β-unsaturated acid, such as maleic acid, fumaric acid, maleic anhydride or mixtures of those compounds. The latter acids are readily available, have good reactivity with the polyol and diamine, and result in products of good properties. The endomethylenetetrahydrophthalic acid may be prepared separately or in situ by methods as will be described. Furthermore, it may be composed totally or partially of the corresponding methyl endomethylenetetrahydrophthalic anhydride.

Part of the α,β-unsaturated acid may be further replaced with a saturated or aromatic polycarboxylic acid to vary the cross-linking potential and physical properties of the modified polyesteramide. Such acids include the aliphatic acids such as adipic acid and the aromatic acids such as isophthalic acid. Replacement of part of the α,β-unsaturated acid with such acids is commonplace in the polyester art. Suitable selection of acid and amount to achieve a desired purpose will be known to the skilled worker and can be optimized with simple preliminary experiments.

The total amount of acid varies as a function of the total polyol, diamine and dicyclopentadienyl ingredients used.

The terminal group used to modify the polyesteramide is a dicyclopentadienyl radical. Dicyclopentadiene or a concentrate containing dicyclopentadiene is a most preferred functional material to be employed in terminating one or both ends of the chain.

DCPD is sold commercially as a product of about 97 or greater percent purity. It is also sold as a $C_{10}$ hydrocarbon concentrate prepared by dimerizing a crude $C_5$ stream from the cracking of hydrocarbons as taught in U.S. Pat. No. 3,557,239. A preferred DCPD source is one that is low in peroxides and hydroperoxides and in light hydrocarbons and residual cyclopentadiene.

These concentrates have as the main reactive components about 70 to about 90 percent by weight of dicyclopentadiene, about 5 to about 30 percent by weight of the mixed Diels-Alder dimers of diolefins such as butadiene, cis- and trans-piperylene, isoprene, cyclopentadiene and methyl cyclopentadiene. The remainder of these concentrates generally comprise residual $C_5$ hydrocarbons and oligomers of the above diolefins.

Examples of some of the dimers which have been identified in these concentrates are the Diels-Alder adducts of two moles of isoprene (isoprene dimers), the adduct of cyclopentadiene and isoprene, the adduct of cyclopentadiene and piperylene, and the like.

Either the $C_{10}$ concentrate or the relatively pure DCPD may be employed in preparing the modified polyesteramides.

The modified polyesteramides can be prepared by a variety of techniques. In a preferred method, hereinafter called the "hydrolysis method," molten $\alpha,\beta$-unsaturated carboxylic anhydride and/or acid is partially hydrolyzed with less than the stoichiometric equivalent of water and reacted with less than or equal to the stoichiometric equivalent of the dicyclopentadiene derivative to form an esterified derivative and unreacted derivative and containing unesterified acid and anhydride. The reaction temperature is raised to at least partially dedimerize the unreacted derivative and to form endomethylenetetrahydrophthalic anhydride via Diels-Alder reaction of cyclopentadiene with unesterified anhydride. This reaction may conveniently be performed in stages whereby reactants are added stepwise, thus controlling exotherms. That product mixture is then reacted with the polyol and diamine to result in the desired modified polyesteramide.

In a typical procedure, molten maleic anhydride and a fraction of the stoichiometric equivalent of water are maintained at an elevated temperature of from about 60° to 130° C. The initial fractional equivalent of dicyclopentadiene (DCPD) is then added and allowed to react. A second fractional equivalent of water and of DCPD is added and allowed to react at elevated temperature of from about 100° to 160° C. Additional fractional equivalents of DCPD are added and each allowed to react before subsequent addition of the next increment until the desired amount of DCPD has been added. The temperature is then maintained at 130° C. or higher to complete the reaction of the dicyclopentadiene derivative.

To the mixture of esterified DCPD, endomethylenetetrahydrophthalic anhydride and any acid, and unreacted $\alpha,\beta$-unsaturated carboxylic acid and/or anhydride is added the polyol and diamine. That addition can be a bulk addition wherein all of the polyol and diamine are added in one step. Alternatively, the addition can be an incremental addition wherein all of the polyol and a fractional equivalent of the diamine are added initially and allowed to react after which subsequent increments of diamine are added. In all instances, water is continuously removed during the esteramidation step. The timing of the remaining diamine additions can be easily determined by the amount of water removed, by acid number and/or by viscosity. A convenient and practical guide is to add a diamine increment when about one fourth to one half of the expected water from the reaction has been collected. Incremental diamine addition aids in the control of reaction exotherm when certain diamines are used.

After addition of the polyol and diamine is complete, the reaction can be driven to maximum yield by maintaining or increasing the temperature, preferably from 160° to 205° C., until the desired acid number has been reached. Typically, acid numbers of 25 to 35 are preferred, although acid numbers that are somewhat higher or lower may be tolerated, and, in some instances, may be desired for certain applications.

In an equally preferred method, hereinafter called the "direct method," molten maleic anhydride and/or acid and the desired amount of DCPD are reacted at an elevated temperature to form endomethylenetetrahydrophthalic anhydride. After cooling the reaction, the unreacted maleic anhydride is hydrolyzed with less than, equal to or greater than the a stoichiometric equivalent of water and reacted with the dicyclopentadiene derivative to form an esterified derivative and containing unesterified acid. This reaction may conveniently be performed in stages whereby reactants are added stepwise thus controlling reaction exotherms. That product mixture is then reacted with the polyol and diamine as earlier mentioned to result in the desired modified polyesteramide.

In a typical procedure, molten maleic anhydride and the desired amount of DCPD are maintained at an elevated temperature of from about 150° C. or higher to form endomethylenetetrahydrophthalic anhydride. The temperature is then allowed to stabilize at about 60° to 130° C. and a fractional equivalent of water is added. A fractional equivalent of DCPD is added and allowed to react. A second fractional equivalent of water and of DCPD is added and allowed to react. Additional fractional equivalents of DCPD are added and each allowed to react before subsequent addition of the next increment until the desired amount of DCPD has been added.

The polyol and diamine are added to the mixture of esterified DCPD and acid as described in the aforementioned hydrolysis method.

In a further modification of either the hydrolysis or direct method, a polyol containing 3 or more hydroxyl groups such as pentaerythritol may be separately added to the reaction after polyesteramidation is substantially complete. This serves to rapidly increase molecular weight and viscosity by cross-linking of the esteramide chains. Modified physical properties result from this embodiment.

Many other alternate methods will be recognized by the skilled worker. For example, molten maleic anhydride may be added to a mixture of DCPD and water maintained in a reactor. The polyol and diamine are added to the mixture of esterified DCPD and acids and/or anhydrides as before. Finally, although less preferred, DCPD, maleic anhydride, water, glycol, and none, all or part of the diamine may be simultaneously reacted.

An alternate method, hereinafter called the "half ester method," for preparing the modified polyesteramides, involves preparing the central esteramide chain employing endomethylenetetrahydrophthalic anhydride and subsequently capping at least one end of that chain with the dicyclopentadiene derivative. Water is not used in this method. In a typical procedure, endomethylenetetrahydrophthalic anhydride, an α,β-unsaturated dicarboxylic anhydride, a glycol and a diamine are reacted at an elevated temperature of about 130° to 150° C. with removal of water. After substantial completion of that reaction, a fraction of the dicyclopentadiene derivative, such as DCPD, is added and reacted at elevated temperature. That is followed by additional increments of DCPD with each succeeding increment added after substantial completion of the reaction of the preceding increment. After all DCPD additions are complete, reaction is continued at about 200° C. with continual removal of water until the desired acid number is reached.

In any of the above procedures, when a dicyclopentadiene concentrate containing piperylene and/or isoprene codimers of cyclopentadiene is used, dedimerization of said codimers followed by subsequent reaction of piperylene and/or isoprene with maleic anhydride and/or acid leads to formation of methyl tetrahydrophthalic anhydrides and/or acids. The methyl tetrahydrophthalyl groups are incorporated into the esteramide chains in a manner identical to that of the endomethylenetetrahydrophthalyl groups.

As is common in the unsaturated polyester and polyesteramide art, the modified polyesteramides of this invention may be blended with a monomer that is compatible therewith. Typical of the vinyl monomers are the alkenyl aromatics, such as styrene or vinyltoluene. Acrylic monomers, although less preferred, may also be used separately or in conjunction with the vinyl monomer. Typical of the acrylic monomers is dicyclopentadiene acrylate. Other useful monomers will be known to the skilled worker. The vinyl monomer frequently called a reactive diluent, may be employed within a wide range of concentration of from about 20 to 80 percent of diluent to 80 to 20 percent of the polyesteramide. The optimum amount will depend in large measure on the polyesteramide, the diluent and the properties desired in the uncured and the cured states. Reactive diluents are employed principally to adjust the viscosity of a resin blend to permit its facile use in a given fabrication procedure. A coating formulation will usually require a lower viscosity than a molding formulation.

Other additives that are conventional in the polyester and polyesteramide art may also be included in formulations based upon these modified polyesteramides. Thus, fillers, pigments and other colorants, reinforcing fibers, and other additives may be added to serve their intended function.

The polyesteramides are curable by known catalyst systems. Peroxides, such as methyl ethyl ketone peroxides, can be used with or without known promoters, such as cobalt octoate or cobalt naphthenate, that function with such peroxides. Acyl peroxides, such as benzoyl peroxides can be used with or without promoters such as tertiary amines, including typically dimethyl aniline and N,N-dimethyl-p-toluidine. The concentrations of catalyst and promoter are adjusted within known limits of from about 0.1 to 3.0 weight percent depending on the rate of cure desired, the magnitude of the generated exotherm and for other known purposes. Known gelation retading agents, such as p-benzoquinone, can be employed in the curing system.

The modified polyesteramides have properties that make them well adapted for coating, casting, lamination, molding, filament winding and other known fabrication procedures. A preferred use is in glass fiber laminates. The compositions prepared from the polyesteramides form articles that are especially useful in corrosive environments, high temperature environments or in some electrical insulating applications, such as encapsulation of electrical components.

The compositions and process of the invention are illustrated in the following examples wherein all parts and percentages are by weight.

EXAMPLE 1

A modified polyesteramide was prepared using a DCPD concentrate containing 83.94 percent DCPD, 14.41 percent cyclopentadiene codimers and diolefin dimers, 1.11 percent lights, and 0.55 percent cyclopentadiene. The procedure used was the hydrolysis method involving 3 steps, viz: (a) a hydrolysis step consisting of the reaction of DCPD or a DCPD concentrate plus maleic anhydride, and water, (b) a diol/diamine addition step and (c) a polyesteramidation step. Specifically, the reaction was performed as follows:

(a) Hydrolysis Step

Maleic anhydride (196.12 grams) is charged to a reactor and melted to a clear solution maintained under nitrogen at 70° C. Water (18.92 grams) is added followed by DCPD concentrate (40.1 grams) after 2 minutes. Fifteen minutes later, the reaction temperature was held at 105° C., the typical maximum exotherm encountered during this stage of the reaction. After an additional 5 minutes, DCPD concentrate (40.1 grams) and water (6.31 grams) are added to the reactor, and the temperature controller is set at 140° C. At the end of 15 minutes, the 140° C. temperature is achieved and a third aliquot of DCPD concentrate (40.1 grams) is added to the reactor. An exotherm of 150°-155° C. ensues and the temperature controller is set at 145° C. The final aliquot of DCPD concentrate (40.1 grams) is charged to the reactor followed by 30 minutes of post reaction at 145° C.

This hydrolysis method leads to intial formation of esterified DCPD followed by generation of comparatively lower concentrations of endomethylenetetrahydrophthalic anhydride and acid during the final 2 DCPD additions at 140°-155° C. Due to the higher reaction temperature and the presence of a high concentration of carboxylic acid functionality, extensive isomerization of maleate to fumarate is also believed to have occurred.

(b) Diol/Diamine Addition Step

Two different modes of addition of the diol/diamine components are employed.

In the *bulk diamine addition method,* the total required diol/diamine stoichiometry of 1.56 moles is added to the reactor followed by heating to 160° C. and removal of water via a steam condenser—Dean Stark trap—cold water condenser assembly with increased nitrogen sparging. Thus, in this example, a total of 94.97 grams of propylene glycol and 60.63 grams of bis-(aminomethyl)dicyclopentadiene were used. A total reaction time of 2 hours is used at the 160° C. temperature during which time water is continually removed from the reaction via nitrogen sparging.

In the incremental diamine addition method, the total required diol stoichiometry plus about ⅓ of the diamine stoichiometry are added to the reactor. After about ¼ of the expected water of reaction was removed, a second increment of ⅓ of the diamine was added. A third increment of ⅓ of the diamine was added after about ½ of the expected water of reaction had been removed.

Thus, in this example, the increments of bis(aminomethyl)dicyclopentadiene were each 20.21 grams.

(c) Polyesteramidation Step

The reaction temperature is increased to 205° C. and water is continually removed until the desired final acid number is attained. Typically, acid numbers of 25 to 35 are preferred. The reaction is cooled to 160° C. and 100 ppm of hydroquinone is added as an inhibitor.

Thus, in this example, after 0.85 hour of polyesteramidation at 205° C., a total of 35 milliliters of water and 6.5 milliliters of organic material were collected in the Dean-Stark trap. The polyesteramide alkyd was recovered as a clear light amber solid with a final acid number of 33.0.

EXAMPLE 2

A modified polyesteramide was prepared using the hydrolysis step of Example 1(a).

(b) Diol/Diamine Addition Step

A diol/diamine addition step was completed using the bulk diamine addition method of Example 1(b) with dicyclopentadiene dimethanol (244.97 grams) and hexane-1,6-diamine (36.26 grams) as the reactants.

(c) Polyesteramidation Step

After 0.25 hour of polyesteramidation at 205° C., a total of 31.5 milliliters of water layer and 2.0 milliliters of organic material were collected in the Dean-Stark trap. The reactor was cooled to 160° C. and 100 ppm of hydroquinone was added. The polyesteramide alkyd was recovered as a clear, light yellow solid with a final acid number of 30.3.

EXAMPLE 3

A modified polyesteramide was prepared using the hydrolysis method of Example 1(a).

(b) Diol/Diamine Addition Step

A diol/diamine addition step was completed using the incremental diamine addition method of Example 1(b) with propylene glycol (89.04 grams) and 4,4'-methylenebis(cyclohexylamine) (82.04 grams) as the reactants. In this example, the increments of 4,4'-methylenebis(cyclohexylamine) were each 27.35 grams.

(c) Polyesteramidation Step

After 1.13 hours of polyesteramidation at 205° C., a total of 28.0 milliliters of water layer and 2.0 milliliters of organic material were collected in the Dean-Stark trap. The reactor was cooled to 160° C. and 100 ppm of hydroquinone were added. The polyesteramide alkyd was recovered as a clear, yellow solid with a final acid number of 34.4.

EXAMPLE 4

A modified polyesteramide was prepared using 98 percent DCPD. The procedure used was the direct method involving 4 steps, viz: (a) a dedimerization of dicyclopentadiene in the presence of maleic anhydride, (b) a hydrolysis step consisting of the reaction of DCPD or a DCPD concentrate plus the maleic anhydride/endomethylenetetrahydrophthalic anhydride of step (a), and water, (c) a diol/diamine addition step and (d) a polyesteramidation step. Specifically, the reaction was performed as follows:

(a) Dedimerization Step

Maleic anhydride (196.12 grams) is charged to a reactor and melted to a clear solution and held at 170° C. under nitrogen. DCPD (13.22 grams) (to be converted to endomethylenetetrahydrophthalic anhydride) is slowly added to the molten MA solution and held under reflux to provide 0.2 mole of anhydride plus unreacted MA. Following completion of the DCPD addition, the reaction temperature is increased to 180° C. and held for 30 minutes. After cooling the reactor down to 70° C., the remaining hydrolysis reaction is then completed in a stepwise fashion according to the following schedule:

(b) Hydrolysis Step

Water (18.92 grams) was added to the maleic anhydride/endomethylenetetrahydrophthalic anhydride solution at 70° C.;
after 2 minutes, DCPD (36.36 grams) was added;
twenty minutes later DCPD (36.36 grams) and water (6.31 grams) were added;
15 minutes later DCPD (36.36 grams) was added;
15 minutes later the final portion of DCPD (36.36 grams) was added and the temperature controller set at 110° C.;
the mix was post reacted at 110° C. for 30 minutes.

(c) Diol/Diamine Addition Step

The diol and diamine were added by the incremental addition method described in Example 3 using three diamine increments of 4,4'-methylenebis(cyclohexylamine) of 27.35 grams and propylene glycol (89.04 grams) as the diol.

(d) Polyesteramidation Step

The polyesteramidation step was as described in Example 1(c). After 1.73 hours of polyesteramidation at 205° C., a total of 22.5 milliliters of water and 5.0 milliliters of organic material were collected in the Dean-Stark trap. The reactor was cooled to 160° C. and 100 ppm of hydroquinone were added. The polyesteramide alkyd was recovered as a clear, light amber solid with a final acid number of 31.8.

COMPARATIVE EXAMPLES C-1 TO C-8

Various DCPD modified unsaturated polyesteramides and polyesters were prepared using the stoichiometry of the previous examples, except that no endomethylenetetrahydrophthalic anhydride was employed. The single exception is Comparative Example 6 in which endomethylenetetrahydrophthalic anhydride was generated. The resulting polyesteramide and polyester alkyds were formulated and tested using the methods of Example 5. The following results were obtained.

COMPARATIVE EXAMPLE 1

A modified polyesteramide free of endomethylenetetrahydrophthalyl functionality was prepared using the hydrolysis method specifically as follows:

(a) Hydrolysis Step

Maleic anhydride (196.12 grams) was added to a reactor and heated to 70° C. under a nitrogen atmosphere. Water (18.92 grams) was added, followed by dicyclopentadiene concentrate (40.10 grams) two minutes later. The dicyclopentadiene concentrate contained 83.94 percent DCPD, 14.41 percent cyclopentadiene codimers and diolefin dimers, 1.11 percent lights and 0.55 percent cyclopentadiene. A maximum exotherm of 104° C. resulted 12 minutes later. Additional dicyclopentadiene concentrate (40.10 grams) and water (6.31 grams) were added to the reactor 20 minutes after the initial water addition. A third aliquot of dicyclopentadiene concentrate (40.10 grams) was added 15 minutes later. Fifteen minutes later, a final aliquot of dicyclopentadiene concentrate (40.10 grams) was added and the temperature controller was set at 110° C. This temperature was achieved seven minutes later.

(b) Diol/Diamine Addition Step

The diol/diamine addition step was completed in identical manner to Example 1(b).

(c) Polyesteramidation Step

After 0.37 hour of polyesteramidation at 205° C., a total of 42.0 milliliters of water layer and 11.5 milliliters of organic material were collected in the Dean-Stark trap. The reactor was cooled to 160° C. and 100 ppm of hydroquinone were added. The polyesteramide alkyd was recovered as a clear, amber solid with a final acid number of 32.5.

COMPARATIVE EXAMPLE 2

A modified polyesteramide was made by replacing the hydrolysis step of Comparative Example 1(a) with a step consisting of the esterification of dicyclopentadiene monoalcohol with fumaric acid. The reaction was performed as follows:

(a) Esterification Step

Fumaric acid (2.0 moles), DCPD monoalcohol (1.2 moles) and SnO catalyst (0.05 percent) were charged to a reactor and heated to 185° C. under a nitrogen atmosphere. Water was continually removed via a steam condenser—Dean-Stark trap—cold water condenser assembly, and increased nitrogen sparging. A total reaction time of 2.5 hours was used at the 185° C. temperature.

(b) Diol/Diamine Addition Step

The diol/diamine addition step was completed in identical manner to Example 1(b).

(c) Polyesteramidation Step

After 0.80 hour of polyesteramidation at 205° C., a total of 52.0 milliliters of water layer and 3.0 milliliters of organic material were collected in the Dean-Stark trap. The reactor was cooled to 160° C. and 100 ppm of hydroquinone were added. The polyesteramide alkyd was recovered as a clear, light yellow solid with a final acid number of 35.3.

COMPARATIVE EXAMPLE 3

A modified polyester was prepared using the hydrolysis method of Comparative Example 1(a).

(b) Diol Addition Step

A diol addition step was completed in identical manner to Example 1(b) except that no diamine reactant was used.

(c) Polyesterification Step

After 2.18 hours of polyesterification at 205° C., a total of 43.0 milliliters of water layer and 4.5 milliliters of organic material were collected in the Dean-Stark trap. The reactor was cooled to 160° C. and 100 ppm of hydroquinone were added. The polyester alkyd was recovered as a clear, light yellow solid with a final acid number of 33.2.

COMPARATIVE EXAMPLE 4

A modified polyesteramide free of endomethylenetetrahydrophthalyl functionality was prepared using the hydrolysis step of Comparative Example 1(a).

(b) Diol/Diamine Addition Step

The diol/diamine addition step was completed in identical manner to Example 2(b).

(c) Polyesteramidation Step

After 0.17 hour of polyesteramidation at 205° C., a total of 35.0 milliliters of water layer and 15.0 milliliters of organic material were collected in the Dean-Stark trap. The reactor was cooled to 160° C. and 100 ppm of hydroquinone were added. The polyesteramide alkyd was recovered as a clear, light yellow solid with a final acid number of 33.7.

COMPARATIVE EXAMPLE 5

A modified polyester was prepared using the hydrolysis method of Comparative Example 1(a).

(b) Diol Addition Step

A diol addition step was completed in identical manner to Example 2(b) except that no diamine reactant was used.

(c) Polyesterification Step

After 0.28 hour of polyesterification at 205° C., a total of 30.0 milliliters of water layer and 5.0 milliliters of organic material were collected in the Dean-Stark trap. The reactor was cooled to 160° C. and 100 ppm of hydroquinone were added. The polyester alkyd was recovered as a clear, light yellow solid with a final acid number of 32.0.

COMPARATIVE EXAMPLE 6

A modified polyester containing endomethylenetetrahydrophthalyl functionality was prepared using the hydrolysis step of Example 2(a).

(b) Diol Addition Step

A diol addition step was completed in identical manner to Example 2(b) except that no diamine reactant was used.

(c) Polyesterification Step

After 1.20 hours of polyesterification at 205° C., a total of 31.5 milliliters of water layer and 1.5 milliliters of organic material were collected in the Dean-Stark trap. The reactor was cooled to 160° C. and 100 ppm of hydroquinone were added. The polyester alkyd was recovered as a clear, light yellow solid with a final acid number of 31.6.

COMPARATIVE EXAMPLE 7

A modified polyesteramide free of endomethylenetetrahydrophthalyl functionality was prepared using the hydrolysis step of Comparative Example 1(a).

(b) Diol/Diamine Addition Step

The diol/diamine addition step was completed in identical manner to Example 3(b).

(c) Polyesteramidation Step

After 0.42 hour of polyesteramidation at 205° C., a total of 31.5 milliliters of water layer and 5.5 milliliters of organic material were collected in the Dean-Stark trap. The reactor was cooled to 160° C. and 100 ppm of hydroquinone were added. The polyesteramide alkyd was recovered as a clear, light yellow solid with a final acid number of 34.6.

COMPARATIVE EXAMPLE 8

A modified polyesteramide containing endomethylenetetrahydrophthalyl functionality was prepared without the use of water as a reactant. The reaction was specifically performed as follows:

Maleic anhydride (196.12 grams) and DCPD concentrate (66.80 grams) were charged to a reactor and heated to 180° C. under a nitrogen atmosphere. The DCPD concentrate contained 83.94 percent DCPD, 14.41 percent cyclopentadiene codimers and diolefin dimers, 1.11 percent lights and 0.55 percent cyclopentadiene. The reaction mixture was held for 60 minutes at the 180° C. temperature after which time propylene glycol (125.60 grams) and 4,4'-methylenebis(cyclohexylamine) (115.7 grams) were added to the reaction. The temperature controller was set at 200° C. and this temperature was achieved 15 minutes later. After 45 minutes at the 200° C. temperature, a total of 17.5 milliliters of water layer was collected in the Dean-Stark trap. The reactor was cooled to 165° C. and 100 ppm of hydroquinone were added. The polyesteramide alkyd was recovered as a clear, amber solid with a final acid number of 30.1.

EXAMPLE 5

The resulting modified polyesteramide alkyds of Examples 1-4 and the modified polyesteramide and polyester alkyds of Comparative Examples 1-8 were formulated to obtain 57.0 percent alkyd-43.0 percent styrene solutions. These solutions were used to determine SPI gel characteristics (84° C.), Brookfield viscosity (25° C.), and various castings were made for heat distortion temperature, tensile and flexural strength, flexural modulus, percent elongation and corrosion resistance determinations.

The heat distortion bars were cured at room temperature using 0.1 percent cobalt naphthenate (6.0 percent), 1.0 percent methyl ethyl ketone peroxide and 0.02 percent dimethylaniline. The room temperature cured bars were post cured for 2.0 hours at 93° C. (200° F.). Circular, clear, unfilled castings of 3.5 cm diameter and 0.5 cm thick were cured and post cured using the method described for the heat distortion bars. Corrosion tests were performed in DI water, toluene, 5 percent sodium hydroxide and 25 percent sulfuric acid for 7 days at 25° C. Clear, unfilled castings for use in tensile and flexural strength evaluations were made using a cure system of 1.0 percent benzoyl peroxide and 0.01 percent dimethylaniline at room temperature followed by post curing for 2.0 hours at 93° C. (200° F.). Standard tensile (six) and flexural (five) test pieces were cut from the castings and tested using the Instron with standard test methods. All Barcol hardness values are on the 934-1 scale. Hydrocarbon reactives efficiency values are based on the grams of organic material recovered overhead into the Dean-Stark trap up until the reaction temperature was increased to 205° C. versus the grams of reactive dicyclopentadiene, cyclopentadiene codimers and diolefin dimers used.

The results are shown in the following Table I. Corrosion test results are shown in Table II. All changes are reported as percentages of original.

In all of the following tables, the heat distortion temperatures are reported in degrees C. The values for tensile strength as well as flexural strength and modulus were determined in pounds per square inch (reported parenthetically as Pascals calculated by multiplying the psi by 6.89). Viscosity was determined in centipoises and converted to Pascal-seconds by multiplying the former by 0.001.

TABLE I

| Example | Hydrocarbon Reactive Efficiency (%) | Brookfield Viscosity (Pa.s) | HDT (°C.) | SPI Gel Gel Time (min.) | SPI Gel Cure Time (min.) | SPI Gel Maximum Exotherm (°C.) |
|---|---|---|---|---|---|---|
| 1 | 96.9 | .184 | 108.9 | 1.45 | 3.15 | 202.5 |
| 2 | 99.4 | .120 | 93.9 | 3.0 | 5.4 | 125 |
| 3 | 99.4 | .348 | 106.7 | 2.5 | 4.4 | 204 |
| 4 | 99.4 | 1.130 | 110.0 | 1.2 | 2.4 | 206 |
| C-1 | 92.8 | .053 | 106.1 | 1.3 | 2.9 | 169 |
| C-2 | — | .134 | 110.6 | 3.4 | 4.9 | 163 |
| C-3 | 97.8 | .045 | 99.4 | 5.6 | 7.1 | 156 |
| C-4 | 91.9 | .143 | 88.3 | 4.2 | 7.1 | 140 |
| C-5 | 96.9 | .091 | 86.1 | 5.3 | 9.6 | 165 |
| C-6 | 99.4 | .109 | 58.9 | 7.8 | 12.3 | 136 |
| C-7 | 96.6 | .143 | 111.1 | 3.3 | 5.0 | 167 |
| C-8 | 86.5 | [cannot measure - insoluble in styrene] | | | | |

| Example | Ave. Barcol Hardness | Tensile Strength × 10³ psi (Pa.s) | Elong. (%) | Flexural Strength × 10³ psi (Pa.s) | Flexural Modulus × 10⁵ psi (Pa.s) |
|---|---|---|---|---|---|
| 1 | 43.3 | 3.730 (25.70) | 0.84 | 9.830 (67.73) | 5.77 (39.76) |
| 2 | 45.3 | 4.574 (31.54) | 0.97 | 10.672 (73.53) | 6.07 (41.82) |
| 3 | 42.3 | 4.717 (32.50) | 0.98 | 10.106 (69.63) | 5.32 (36.65) |
| 4 | 46.3 | 4.241 (29.22) | 0.92 | 9.783 (67.40) | 5.40 (37.21) |
| C-1 | 45.0 | 5.337 (25.85) | 1.20 | 10.749 (74.06) | 5.79 (39.89) |
| C-2 | 45.6 | 4.162 (28.68) | 1.02 | 10.253 (70.64) | 5.66 (39.00) |
| C-3 | 48.3 | 3.117 (21.48) | 0.71 | 10.176 (70.11) | 5.47 (37.69) |
| C-4 | 46.0 | 6.614 (45.57) | 1.42 | 10.985 (75.69) | 5.92 (40.79) |
| C-5 | 47.3 | 6.630 (45.68) | 1.41 | 17.748 (122.28) | 11.66 (80.34) |
| C-6 | 44.4 | 7.703 (53.07) | 1.69 | 12.911 (88.96) | 6.26 (43.13) |
| C-7 | 45.0 | 3.329 (22.94) | 0.82 | 6.792 (46.80) | 5.35 (36.86) |
| C-8 | [cannot measure - insoluble in styrene] | | | | |

TABLE II

| Example | Change Barcol | Change Weight | Change Barcol | Change Weight |
|---|---|---|---|---|
| | DI. Water | | 5% NaOH | |
| 1 | +0.75 | +0.22 | 0 | −1.58 |
| 2 | +1.33 | +0.08 | 0 | −0.14 |
| 3 | −0.88 | +0.25 | +3.62 | −0.30 |
| 4 | +1.69 | +0.32 | −0.43 | −0.17 |
| C-1 | 0 | +0.40 | 0 | −1.84 |
| C-2 | 0 | +0.24 | −2.19 | −1.73 |
| C-3 | −4.32 | −0.23 | −5.44 | −1.59 |
| C-4 | +0.73 | +0.09 | +0.75 | −1.23 |
| C-5 | +3.12 | +0.03 | +1.52[(1)] | −1.07 |

TABLE II-continued

| Example | Change Barcol | Change Weight | Change Barcol | Change Weight |
|---------|---------------|---------------|---------------|---------------|
| C-6 | +2.28 | +0.13 | +2.72 | −0.05 |
| C-7 | +5.13 | +2.21 | +2.29 | −1.81 |
| C-8 | [cannot measure - insoluble in styrene] | | | |
|  | 25% Sulfuric Acid | | Toluene | |
| 1 | 0 | −1.05 | +1.53 | +0.02 |
| 2 | 0 | 0 | −4.05 | +0.07 |
| 3 | −1.37 | +0.28 | +0.88 | −0.08 |
| 4 | −0.88 | +0.29 | +3.76 | −0.03 |
| C-1 | +4.69 | −0.95 | −6.16 | 0 |
| C-2 | 0 | −1.13 | +1.36 | −0.05 |
| C-3 | −2.70 | −1.41 | −2.17 | +0.32 |
| C-4 | +0.74 | −1.75 | −16.44 | +0.57 |
| C-5 | +0.74 | −0.31 | can't measure - sample destroyed by test[(2)] | |
| C-6 | +2.35 | −0.06 | −2.73 | −5.29[(2)] |
| C-7 | +0.75 | −1.32 | +6.54 | −0.37 |
| C-8 | [cannot measure - insoluble in styrene] | | | |

[(1)]After 7 days of exposure, surface is rough and gloss is gone.
[(2)]Time to initial fracture of test sample:
3 days for C-5
4 days for C-6

EXAMPLE 6

Shrinkage upon curing of a clear, unfilled casting of approximately 25 cm in length was measured. A room temperature cure of 1.0 percent methyl ethyl ketone peroxide and 0.1 percent cobalt napthenate (6.0 percent) and 0.02 percent dimethylaniline was used to cure the 43.0 percent styrenated resin solutions as designated by the appropriate example number. The length of each cured casting was measured after the polymerization exotherm had subsided and ambient temperature (25° C.) was reached, and was used to calculate the following percent shrinkage upon curing values:

| Resin of | Shrinkage upon Curing (%) |
|----------|---------------------------|
| Example 1 | 1.31 |
| Example 3 | 0.75 |
| Example 4 | 2.04 |
| Comparative Example C-1 | 1.12 |
| Comparative Example C-2 | 1.50 |
| Comparative Example C-3 | 2.79 |
| Comparative Example C-7 | 1.11 |

EXAMPLE 7

A modified polyesteramide was prepared by replacing the hydrolysis step of Example 1(a) with a hydrolysis step at higher reaction temperatures. The reaction was performed as follows:

Maleic anhydride (196.12 grams) is charged to a reactor and melted to a clear solution maintained under a nitrogen atmosphere at 70° C.; water (18.92 grams) is added, followed by dicyclopentadiene concentrate (40.10 grams) after 2 minutes. The DCPD concentrate contained 83.94 percent DCPD, 14.41 percent cyclopentadiene codimers and diolefin dimers, 1.11 percent lights, and 0.55 percent cyclopentadiene. Fifteen minutes later, the reaction temperature was held at 105° C., the typical maximum exotherm encountered during this stage of the reaction. After an additional 5 minutes, DCPD concentrate (40.10 grams) and water (6.31 grams) are added to the reactor, and the temperature controller is set at 145° C. At the end of 15 minutes, the 145° C. temperature is achieved and a third portion of DCPD concentrate (40.10 grams) was added to the reactor inducing an exotherm to 155° C. and the temperature controller was set at 160° C. A final aliquot of DCPD concentrate (40.10 grams) was added fifteen minutes later inducing an exotherm to 165° C. Post reaction for 30 minutes at 160° C. completes this hydrolysis step.

The diol/diamine and polyesteramidation steps were completed using the methods of Example 1(b) and 1(c), respectively.

Use of this particular reaction configuration with prolonged reaction temperatures above 150° C. lead to the formation of significantly greater quantities of bis(-dicyclopentadienyl)maleate (and to a lesser extent the corresponding fumarate), as determined by liquid chromatographic analysis.

The physical and mechanical properties of a 57.0 percent alkyd-43.0 percent styrene solution were determined using the methods of Example 5. The following results were obtained:

| | |
|---|---|
| Acid Number | 34.9 |
| Reaction time at 205° C. (hr.) | 1.37 |
| Hydrocarbon Reactives Efficiency (%) | 99.4 |
| Brookfield Viscosity (Pa.s) | 0.255 |
| SPI Gel | |
| gel time (min.) | 3.8 |
| cure time (min.) | 5.5 |
| max. exotherm (min.) | 153 |
| Heat Distortion Temperature (°C.) | 98.3 |
| Average Barcol Hardness | 44.1 |
| Tensile Strength × $10^3$ psi | 3.867 |
| (Pa.s) | (26.64) |
| Elongation (%) | 0.81 |
| Flexural Strength × $10^3$ psi | 8.414 |
| (Pa.s) | (56.97) |
| Flexural Modulus × $10^5$ psi | 5.98 |
| (Pa.s) | (41.20) |

What is claimed is:

1. A process for preparing dicyclopentadienyl modified polyesteramides containing endomethylenetetrahydrophthalyl groups within the esteramide chain, said process comprising
   (1) the reaction of
      (a) a dicyclopentadiene or concentrate thereof, water, endomethylenetetrahydrophthalic acid or anhydride and maleic anhydride, maleic acid, fumaric acid or mixture of acid and anhydride, or
      (b) a dicyclopentadiene or concentrate thereof, endomethylenetetrahydrophthalic acid or anhydride, and a polycarboxylic acid, and
   (2) adding additional polycarboxylic acid, if desired, and a polyol and a diamine and reacting to substantial completion.

2. The process of claim 1 wherein said endomethylenetetrahydrophthalic acid anhydride, or mixture thereof is generated directly from reaction of cyclopentadiene resulting from dedimerizing a portion of said dicyclopentadiene or dicyclopentadiene concentrate and maleic anhydride, followed by reaction of dicyclopentadiene with any unreacted or additionally added maleic anhydride and water, further followed by reaction with said polyol, said diamine and any other of said polycarboxylic acid.

3. The process of claim 2 wherein dicyclopentadiene or concentrate thereof is reacted with maleic anhydride at elevated temperature in a ratio of 0.01 to 0.75 mole DCPD to 2 moles maleic anhydride to form a mixture of endomethylenetetrahydrophthalic anhydride and unreacted maleic anhydride, followed by addition and reaction of DCPD and HOH with the unreacted maleic anhydride and any additional maleic anhydride added thereto, then followed by reaction of the so formed products with said diamine, polyol and any other polycarboxylic acid.

4. A dicyclopentadiene modified polyesteramide composed of:
(A) a central esteramide chain containing pendant olefinic unsaturation composed of:
  (a) diamido groups of the formula:

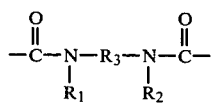

wherein $R_1$ and $R_2$ are independently selected from the group consisting of hydrogen, aliphatic, cycloaliphatic and aromatic or $R_1$ and $R_2$ together form a cycloaliphatic ring, and $R_3$ is a divalent organic radical selected from the group consisting of alkylene, ether-linked alkylene, ether-linked arylene, alkylene amino linked alkylene, alkylene amino linked cycloalylene, cycloalkylene, polycycloalkylene, arylene, bis(alkyl)cycloalkylene and bis(alkyl)polycycloalkylene,
  (b) bisalkoxy groups of the formula:

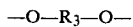

wherein $R_3$ is a divalent organic radical as before defined,
  (c) carboxylic acid groups wherein at least a part of said groups are endomethylenetetrahydrophthalyl and any remaining said groups are $\alpha,\beta$-unsaturated, saturated or aromatic or a mixture thereof,
(B) at least one terminal group of said polyesteramide being a dicyclopentadienyl radical.

5. The modified polyesteramide of claim 4 wherein said diamido groups are from an aliphatic diamine.

6. The modified polyesteramide of claim 5 wherein said diamine is ethylene diamine.

7. The modified polyesteramide of claim 5 wherein said diamine is hexane-1,6-diamine.

8. The modified polyesteramide of claim 4 wherein said diamido groups are from a cycloaliphatic or polycycloaliphatic diamine.

9. The modified polyesteramide of claim 8 wherein said diamine is piperazine.

10. The modified polyesteramide of claim 8 wherein said diamine is bis(aminomethyl)dicyclopentadiene.

11. The modified polyesteramide of claim 8 wherein said diamine is 4,4'-methylenebis(cyclohexylamine).

12. The modified polyesteramide of claim 4 wherein said diamido groups are from an aromatic diamine.

13. The modified polyesteramide of claim 12 wherein said diol is propylene glycol.

14. The modified polyesteramide of claim 12 wherein said diol is dicyclopentadiene dimethanol.

15. The modified polyesteramide of claim 4 wherein said bisalkoxy groups are from an aliphatic diol.

16. The modified polyesteramide of claim 4 formulated with a reactive diluent.

17. The modified polyesteramide of claim 16 wherein said reactive diluent is styrene.

18. A cured article of the polyesteramide of claim 16.

* * * * *